United States Patent Office 3,372,165
Patented Mar. 5, 1968

3,372,165
1,2,3,4,5,6 - HEXAHYDRO - 8 - HYDROXY - 2,6 - METHANO-3-BENZAZOCINE DERIVATIVES
Sydney Archer, Bethlehem, N.Y., assignor to Sterling Drug Inc., New York, N.Y., a corporation of Delaware
No Drawing. Continuation-in-part of application Ser. No. 72,844, Dec. 1, 1960. This application Nov. 23, 1962, Ser. No. 239,777
18 Claims. (Cl. 260—294.7)

ABSTRACT OF THE DISCLOSURE 1,2,3,4,5,6 - hexahydro-3-(Y-lower alkylene-)-6-($R^1$)-11-($R^2$)-8-($R^3$-O-)-2,6-methano-3-benzazocines wherein Y is halo-alkenyl, cyano, cyano-lower alkenyl, or cycloalkyl, $R^1$ is hydrogen or lower alkyl, $R^2$ is hydrogen, methyl, or ethyl, and $R^3$ is a member of the group consisting of hydrogen, methyl, and, when Y is other than cycloalkyl, the further members lower alkanoyl and pyridinecarbonyl, have pharmacodynamic activity and are useful as antagonists of certain strong analgesic agents, such as morphine and meperidine. The preferred species, 1,2,3,4,5,6-hexahydro-3 - cyclopropylmethyl-6,11 - dimethyl - 8 - hydroxy-2,6-methano-3-benzazocine, also has muscle relaxant and anticonvulsant properties and is useful as a nonaddicting strong analgesic.

This application is a continuation-in-part of my prior co-pending application Ser. No. 72,844, filed Dec. 1, 1960.

This invention relates to novel derivatives of 1,2,3,4,5,6 - hexahydro-8-hydroxy-2,6-methano-3-benzazocine, to the preparation thereof, and to intermediates for the same. The new compounds of this invention have pharmacodynamic activity and are useful as antagonists of certain strong analgesic agents, such as morphine and meperidine.

The compounds of the instant invention are the 1,2,3,4,5,6-hexahydro-3 - (Y-lower alkylene-)-6-($R^1$)-11-($R^2$)-8-($R^3$-O-)-2,6-methano-3-benzazocines having the structural formula

FORMULA I

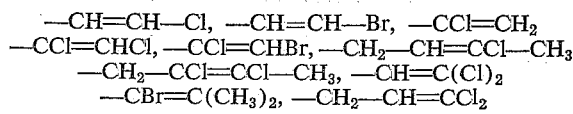

in which Y is a member of the group consisting of: halo-lower alkenyl having 1-2 members of the group consisting of chlorine and bromine attached to ethylenic carbon; cyano; cyano-lower alkenyl; and cycloalkyl; $R^1$ is a member of the group consisting of hydrogen and lower alkyl; $R^2$ is a member of the group consisting of hydrogen, methyl, and ethyl; and $R^3$ is a member of the group consisting of hydrogen, methyl, lower alkanoyl, and pyridinecarbonyl.

When the group Y is halo-lower alkenyl, there are included the monovalent lower molecular weight unsaturated halo-hydrocarbon radicals containing a double bond and having 1-2 members of the group consisting of chlorine and bromine attached to ethylenic carbon, that is, either one or both of the two ethylenic carbons involved in the

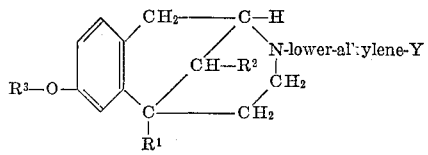

double-bond bear chlorine or bromine, said radical preferably having 2-5 carbon atoms, for example —CH=CH—Cl, —CH=CH—Br, —CCl=CH$_2$
—CCl=CHCl, —CCl=CHBr, —CH$_2$—CH=CCl—CH$_3$
—CH$_2$—CCl=CCl—CH$_3$, —CH=C(Cl)$_2$
—CBr=C(CH$_3$)$_2$, —CH$_2$—CH=CCl$_2$
—CH$_2$CH$_2$—CH=CCl—CH$_3$, and the like. When Y is cyano-lower alkenyl, there are included the monovalent lower molecular weight unsaturated aliphatic cyano-hydrocarbon radicals containing a double bond, and preferably having 3-6 carbon atoms and one or two cyano groups, for example —CH=CH—CN, —C(CN)=CH$_2$, —C(CH$_3$)=CH—CN, —CH$_2$CH=CH—CN,

—CH$_2$CH$_2$—CH=CH—CN

—CH=CH—CH$_2$CH$_2$CH$_2$—CN, —CH=C(CN)$_2$, and the like. When Y is cycloalkyl, there are included cyclopropyl, cyclobutyl, cyclopentyl, cyclohexyl, cycloheptyl, and the like.

The lower alkylene in Formula I includes the bivalent branched and unbranched lower molecular weight saturated hydrocarbon radicals, having preferably 1-4 carbons, for example —CH$_2$—, —CH$_2$CH$_2$—,

—CH(CH$_3$)—, —CH$_2$CH$_2$CH$_2$—

—CH$_2$—CH(CH$_3$)—CH$_2$—, —CH$_2$CH$_2$CH$_2$CH$_2$—, and the like.

When the group $R^1$ is lower alkyl, it preferably contains 1-4 carbon atoms including for example methyl, ethyl, n-propyl, isopropyl, and n-butyl.

When $R^3$ is lower alkanoyl, it preferably contains 1-6 carbon atoms, including for example formyl, acetyl, propionyl, butyroyl, isobutyroyl, and caproyl. When $R^3$ is pyridinecarbonyl, it includes 2-pyridinecarbonyl or picolinoyl, 3-pyridinecarbonyl or nicotinoyl, and 4-pyridinecarbonyl or isonicotinoyl.

The compounds of my invention having the structural formula

FORMULA II

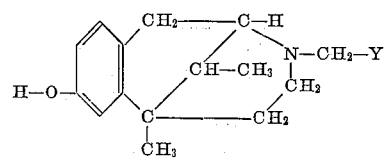

in which Y has the same meaning defined hereinabove have been found to be particularly valuable and represent a particularly preferred aspect of this invention.

Due to the presence of a basic tertiary amino grouping, the compounds of this invention react with organic and inorganic acids to form acid-addition salts; and, due to the presence of both a basic tertiary amino grouping and an acidic phenolic grouping in the structure of the new 1,2,3,4,5,6 - hexahydro-3-(Y-lower alkylene-6)-($R^1$)-11-($R^2$)-8-hydroxy-2,6-methano-3-benzazocines of this invention have amphoteric properties; and therefore for a given compound, the particular molecular species which will predominate will depend on the pH of the environment. Thus, in strongly acidic media, the amino nitrogen will be protonated, and the predominant molecular species will be an acid-addition salt. On the other hand, in strongly alkaline media, the predominant molecular species of the 8-hydroxy compounds, i.e., when $R^3$ is hydrogen, will be that of a phenolate ion; and under pH conditions intermediate between these extremes, the proportion of the undissociated molecular species will increase to reach a maximum as the isoelectric point is approached, the form which is isolable at the isoelectric point being conveniently termed the isoelectric form.

My new compounds can exist in stereochemically isomeric forms, that is, optical isomers and geometric isomers. If desired, the isolation or the production of a particular stereochemical form can be accomplished by application of the general principles known in the prior art.

The acid-addition salt forms and the phenoxide forms of my new compounds are useful not only as antagonists of certain strong analgesic agents, as above-indicated, but are also useful for characterizing and identifying purposes, and in isolation or purification procedures. Moreover, the acid-addition salts and the phenoxides are sources of the free base forms and the isoelectric forms, by reaction with bases or acids, respectively, and accordingly all of the acid-addition salts and the phenoxides, regardless of considerations of solubility, toxicity, physical form, or the like of a particular compound are useful for the purposes of my invention.

It will be appreciated from the above that if one or more of the characteristics, such as solubility, molecular weight, physical appearance, toxicity, or the like of a given free base, isoelectric, phenoxide, or acid-addition salt form of a particular compound render that form unsuitable for the purpose at hand, it can be readily converted to another, more suitable form.

The new 1,2,3,4,5,6-hexahydro-3-(Y-lower alkylene-)-6 - ($R^1$)- 11 -($R^2$)-8-hydroxy-2,6-methano-3-benzazocines of my invention can be conveniently prepared in their isoelectric forms by N-alkylating the corresponding amines, namely the 1,2,3,4,5,6-hexahydro-6-($R^1$)-11-($R^2$)-8-hydroxy-2,6-methano-3-benzazocines, by heating with an alkylating agent having the formula Y-alkylene-An, where Y has the same meaning indicated hereinabove and An is the anion of a strong organic or inorganic acid, for instance a reactive halide or an arylsulfonate, e.g., a tosylate, in the presence of an acid-absorbing medium, for instance an alkali metal carbonate or bicarbonate, for instance sodium bicarbonate. This alkylation reaction is preferably carried out in the presence of a suitable reaction medium such as a lower alkanol, for instance methanol or ethanol, or an N,N-(di-lower alkyl)-lower alkanamide, for instance N,N-dimethylformamide or N,N-dimethylacetamide.

The new 8-methoxy and 8-acyloxy of Formula I are conveniently obtained by appropriate etherification and esterification, respectively, of the corresponding 8-hydroxy compounds, using any of the conventional prior art methods suitable for the etherification and esterification of phenols. Thus, for instance, the 8-methoxy compounds are obtained either directly by treatment of the 8-hydroxy compounds of Formula I with diazomethane, or the 8-hydroxy compounds of Formula III hereinbelow are treated with diazomethane or with dimethyl sulfate to produce the 8-methoxy compounds of Formula III and the latter are reduced with lithium aluminum hydride to produce the 8-methoxy compounds of Formula I. Treatment of the 8-hydroxy compounds of Formula I with the acid anhydride or acid chloride of lower alkanoic acid or pyridinecarboxylic acid yields the corresponding 8-(lower alkanoyloxy) or 8-(pyridinecarbonyloxy) compounds of Formula I.

Another method suitable for preparing those new compounds of this invention which are 1,2,3,4,5,6-hexahydro-3 - (Y' lower alkylene) - 6-($R^1$)-11-($R^2$-8-hydroxy or methoxy-2,6-methano-3-benzazocines wherein the lower alkylene is unbranched, i.e., has the structure —$CH_2$-, at its linkage to the nitrogen atom, comprises N-acylating a 1,2,3,4,5,6 - hexahydro - 6-($R^1$)-11-($R^2$)-8-hydroxy or methoxy-2,6-methano-3-benzazocine with one or two molecular equivalents of an acid halide or acid anhydride of an acid having the formula Y'-(1-oxo-lower alkylene)-OH and reducing the resulting amide or ester-amide derivative which is a 1,2,3,4,5,6-hexahydro-3-[Y'-(-oxo-lower alkylene]-6-($R^1$)-11-($R^2$)-8-hydroxy or methoxy-2,6-methano-3-benzazocine having the structural formula

FORMULA III

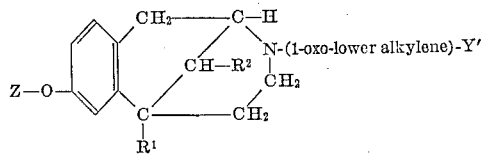

in which Z is a member of the group consisting of hydrogen and methyl when one molecular equivalent of the acylating agent is used, and when an 8-hydroxy starting material is used and two molecular equivalents of the acylating agent are used Z is Y'-(1-oxo-lower alkylene)-, Y' is a member of the group consisting of: halo-lower alkenyl having 1-2 members of the group consisting of chlorine and bromine attached to ethylenic carbon; cyanomethyl; cyano-lower alkenyl; and cycloalkyl, and $R^1$ and $R^2$ have the same meanings hereinabove defined, by treating the compound of Formula III with a reducing agent such as lithium aluminum hydride. This reducing agent is effective to reduce the carbonyl of the amide group to —$CH_2$—, thereby converting 1-oxo-lower alkylene to lower alkylene, without affecting any ethylenic linkages. (As will be appreciated, the oxo is at the end of the alkyl-lower alkylene opposite to the end at which Y' is attached, when lower alkylene contains more than one carbon atom). In the N-acylation of the 8-hydroxy compounds of Formula III, in some instances both N- and O-acylation may occur to yield a mixture of the 3-acyl and 3-acyl-8-acyloxy compounds, but this is of no consequence in the over-all process, because in the reduction step both the amides and the ester-amides of Formula III when Z is either hydrogen or acyl are converted to the 1,2,3,4,5,6-hexahydro - 3-(Y'-lower alkylene-)-6-($R^1$)-11-($R^2$)-8-hydroxy-2,6-methano-3-benzazocine wherein the lower alkylene is unbranched at its linkage to the nitrogen atom.

The acid-addition salt forms of my compounds are prepared from any organic acid, inorganic acid (including organic acids having an inorganic group therein), or organo-metallic acid as exemplified by organic mono- and poly-carboxylic acids such as found, for example, in Beilstein's Organische Chemie, 4th Ed., Volumes III, IV, IX, X, XIV, XVII, XIX, XXI, XXII, and XXV; organic mono- and polysulfonic acid-sulfinic acids such as found, for example in Beilstein Volumes VI, XI, XVI, and XXII; organic phosphonic and phosphinic acids such as found, for example, in Beilstein Volumes XI and XVI; organic acids of arsenic and antimony such as found, for example, in Beilstein Volume XVI; organic heterocyclic carboxylic, sulfonic, and sulfinic acids such as found, for example in Beilstein Volumes XVIII, XXII, and XXV; acidic ion-exchange resins; and inorganic acids of any acid forming element or combination of elements such as found in Mellor, Comprehensive Treatise on Inorganic and Theoretical Chemistry, Longman's, Green and Co., New York, N.Y., Volumes I–XVI. In addition, other salt-forming compounds which are acidic in their chemical properties but which are not generally considered as acids in the same sense as carboxylic or sulfonic acids are also considered to be among the numerous acids which can be used to prepare the acid-addition salt forms of the compounds of this invention. Thus there are also included acidic phenolic compounds such as found, for example, in Volume VI of Beilstein, acidic compounds having "activated" or acidic hydrogen atoms, as for example, picrolonic acid, or barbituric acid derivatives having an acidic proton such as found, for example, in Cox et al. Medicinal Chemistry, Vol. IV, John Wiley and Sons, Inc., New York, N.Y. (1959). Also included as salt forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, citric acid, lactic acid, glycolic acid, gluconic acid, saccharic acid, ascorbic acid, penicillin, benzoic acid, phthalic acid, salicyclic acid, 3,5-dinitrobenzoic acid, anthranilic acid, cholic acid, 2-pyridinecarboxylic acid, pamoic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like. The acid-addition salts with lactic acid and with ethanesulfonic acid, for example, are water-soluble and are especially suitable forms for using my new compounds as antagonists.

The acid-addition salts are prepared in conventional fashion, for instance either by direct mixing of the acid and the free base or isoelectric form or, when this is not appropriate, by dissolving either or both of the acid and the free base or isoelectric form separately in water or an organic solvent and mixing the two solutions, or by dissolving both the acid and the free base or isoelectric form together in a solvent. The resulting acid-addition salt is isolated by filtration, if it is insoluble in the reaction medium, or by evaporation of the reaction medium to leave the acid-addition salt as a residue. The acid moieties or anions in these salt forms are in themselves neither novel nor critical and therefore can be any acid anion or acid-like substance capable of salt formation with the free base or isoelectric forms of my compounds.

The phenolate form of my new 1,2,3,4,5,6-hexahydro-3 - (Y - lower alkylene-)-6-($R^1$)-11-($R^2$)-8-hydroxy-2,6-methano-3-benzazocine is readily obtained for example by treating the isoelectric form with a strong alkali, such as sodium hydroxide. The alkali metal phenolates are water-soluble.

The 1,2,3,4,5,6 - hexahydro-6-($R^1$)-11-($R^2$)-8-hydroxy-2,6-methano-3-benzazocine starting materials for the preparation of the compounds of this invention can be obtained by application of known procedures. Thus, a 3-($R^2$)-4-($R^1$)-pyridine methiodide is interacted with p-methoxybenzylmagnesium chloride; the resulting N-methyl - 2 - (p - methoxybenzyl)-3-($R^1$)-4-($R^2$)-1,2-dihydropyridine is reduced with sodium borohydride or by catalytic hydrogenation to produce an N-methyl-2-(p-methoxybenzyl) - 3 - ($R^2$) - 4 - ($R^1$) - 1,2,5,6-tetrahydropyridine; and this latter product is heated with an appropriate cyclizing agent, such as concentrated hydrobromic or phosphoric acid to yield a 1,2,3,4,5,6-hexahydro-3-methyl - 6 - ($R^1$) - 11 - ($R^2$) - 8-hydroxy-2,6-methano-3-benzazocine. By acetylating the 8-hydroxyl group in this cyclization product by treatment with acetic anhydride and treatment of the resulting 8-acetoxy compound with cyanogen bromide, there is produced a 1,2,3,4,5,6-hexahydro - 3 - cyano - 6 - ($R^1$) - 11 - ($R^2$) - 8 - acetoxy - 2,6-methano-3-benzazocine which, by heating with dilute hydrochloric acid, is converted to the desired 1,2,3,4,5,6-hexahydro - 6 - ($R^1$) - 11 - ($R^2$) - 8 - hydroxy - 2,6-methano-3-benzazocine. This series of reactions is illustrated in part B of Example 2 hereinbelow.

The alkylating agents Y-lower alkylene-An used in the alkylation procedure for preparing my compounds are likewise readily obtainable by known procedures; for instance, in one method the corresponding alcohol having the formula Y-lower alkylene-OH is esterified with a strong organic or inorganic acid having the formula H-An.

By alternative system of nomenclature, the compounds of this invention are designated as benzomorphan derivatives, that is, as 2-(Y-lower alkylene-)-2'-($R^3$-O-)-5-($R^1$)-9-($R^2$)-6,7-benzomorphans.

The structures of the compounds of this invention followed from the methods of synthesis which were used and from the elementary analyses of the products obtained.

My invention is illustrated by the following examples without, however, being limited thereto.

EXAMPLE 1

*1,2,3,4,5,6-hexahydro-3-(3-chloro-2-propenyl)-6,11-dimethyl-8-hydroxy-2,6-methano-3-benzazocine*

A mixture of 8.7 g. of 1,2,3,4,5,6-hexahydro-6,11-dimethyl-8-hydroxy-2,6-methano - 3 - benzazocine (which is known also as 2'-hydroxy-5,9-dimethyl - 6,7 - benzomorphan), 4.4 g. of 1,3-dichloro-1-propene, 5.0 g. of sodium bicarbonate, and 125 ml. of N,N-dimethylformamide was stirred and refluxed for approximately five hours. The reaction mixture was then filtered, and the solid collected on the filter was washed with ethanol. The filtrate and the wash liquor were combined and concentrated under reduced pressure, and water and diethyl ether were added to the resulting brown syrupy residue. The ether layer was separated and extracted with dilute hydrochloric acid. Concentrated ammonium hydroxide was added to the acidic aqueous extract, thus causing separation of a gum. This gum was dissolved in diethyl ether, and the resulting solution was filtered to remove a small amount of insoluble brown amorphous solid. The filtrate was charcoaled to remove some of its color, was concentrated under reduced pressure, and was then cooled in a refrigerator. The solid which separated from solution was collected on a filter and dried. The white solid thus obtained weighed 2.6 g. and melted at 165–176° C. It was recrystallized from methanol to yield 1.7 g. of white granules which melted at 174–186° C. The product thus obtained was 1,2,3,4,5,6-hexahydro-3-(3-chloro-2-propenyl)-6,11-dimethyl-8-hydroxy-2,6-methano-3- benzazocine (Formula I: Y=—CH=CH—Cl; lower alkylene=—$CH_2$—;

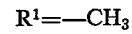

$R^1$=—$CH_3$ $R^2$=—$CH_3$  $R^3$=—H) in the form of a mixture of cis and trans isomers, having the molecular formula $C_{17}H_{22}ClNO$. This product was soluble in a mixture of 0.34 ml. of N/2 hydrochloric acid and 0.16 ml. of water to the extent of 10 percent, the pH of the 1 percent solution being 2.0; and when the pH of these solutions was gradually raised by addition of N/10 sodium hydroxide solution, a precipitate formed at pH 6.0.

When the above preparation was repeated using pure trans-1,3-dichloro-1-propene as the alkylating agent, the product obtained was trans-1,2,3,4,5,6-hexahydro - 3 - (3-chloro-2-propenyl)-6,11-dimethyl-8-hydroxy - 2,6 - methano-3-benzazocine in the form of white crystals which melted at 156–158° C. The solubility of this product in water was less than 0.25 percent, and its solubility in ethanol was less than 1 percent (weight/volume).

When pure cis-1,3-dichloro-1-propene was used as the alkylating agent, there was obtained cis-1,2,3,4,5,6-hexahydro-3-(3-chloro-2-propenyl)-6,11-dimethyl-8 - hydroxy-2,6-methano-3-benzazocine in the form of pale yellow crystals which melted at 186–189° C. The solubility of this product in a mixture of 0.34 ml. of N/2 hydrochloric acid and 19.66 ml. of water was less than 0.25 percent, and its solubility in ethanol was less than 1 percent (weight/volume).

EXAMPLE 2

*1,2,3,4,5,6-hexahydro-3-(3,3-dichloro-2-propenyl)-6-ethyl-11-methyl-8-hydroxy-2,6-methano-3-benzazocine*

A. Following a procedure similar to that described in Example 1 hereinabove but using 5.0 g. of 1-bromo-3,3-dichloro-2-propene and 6.2 g. of 1,2,3,4,5,6-hexahydro-6-ethyl-11-methyl-8-hydroxy-2,6-methano-3 - benzazocine as the reactants, there was obtained 5.8 g. of 1,2,3,4,5,6-hexahydro - 3 - (3,3 - dichloro - 2 - propenyl) - 6 - ethyl-11-methyl-8-hydroxy-2,6-methano - 3 - benzazocine (Formula I: $Y=-CH=C(Cl)_2$; lower alkylene $=-CH_2-$; $R^1=-C_2H_5$; $R^2=-CH_3$; $R^3=-H$) having the molecular formula $C_{18}H_{23}Cl_2NO$, in the form of tan crystals which melted at 150–153° C. The solubility of this compound in a mixture of 0.30 ml. of N/2 hydrochloric acid and 19.70 ml. of water was less than 0.25 percent, and its solubility in ethanol was less than 1 percent (weight/volume).

B. The following procedure was employed for preparing the 1,2,3,4,5,6-hexahydro-6-ethyl-11 - methyl - 8 - hydroxy-2,6-methano-3-benzazocine starting material in the procedure described in part A above.

A solution of 151 g. of p-methoxybenzyl chloride in 925 ml. of anhydrous diethyl ether was added slowly over a period of approximately three hours to a refluxing mixture of 1725 ml. of anhydrous diethyl ether, 50.5 g. of magnesium turnings, and 42.3 g. of magnesium powder. The liquid in the reaction mixture was then siphoned away from the solid, which remained at the bottom of the reaction vessel, into a solution of 127 g. of 3-methyl-4-ethylpyridine methiodide (prepared by interaction of equimolecular amounts of 3-methyl-4-ethylpyridine and methyl iodide) in 925 ml. of diethyl ether. The resulting mixture was stirred for approximately one hour, and the reaction mixture thus obtained was poured into a mixture of ice and water having one-half pound of ammonium chloride dissolved therein. The mixture, which had a lower, aqueous layer and an upper, ethereal layer, was made basic by addition of concentrated ammonium hydroxide. The ethereal layer was then separated from the aqueous layer and dried. The dry ethereal solution was concentrated and the resulting residue, which contained N-methyl-2-(p-methoxybenzyl) - 3 - methyl - 4-ethyl-1,2-dihydropyridine, was dissolved in 430 ml. of methanol. To this solution there was gradually added over a period of fifteen minutes 9.3 g. of sodium borohydride in 80 ml. of ice water, the temperature of the resulting reaction mixture being kept below 40° C. by means of an ice-bath during the addition. The reaction mixture was stirred at room temperature for one-half hour more, and then the methanol was distilled from the reaction mixture, leaving a residue containing N-methyl-2-(p-methoxybenzyl)-3-methyl-4-ethyl-1,2,5,6-tetrahydropyridine.

The foregoing procedure was repeated, using the same amounts of reactants and other materials with the exception that 106 g. of 3-methyl-4-ethylpyridine methiodide was employed instead of 127 g.

The two residues thus obtained containing N-methyl-2-(p-methoxybenzyl)-3-methyl-4-ethyl-1,2,5,6 - tetrahydropyridine were combined and the desired product was isolated therefrom as follows. Water and ether were mixed with the combined residues, and the two layers in the resulting mixture were separated, the aqueous layer being discarded, and the ethereal layer was extracted with water to which had been added 80 ml. of concentrated hydrochloric acid. The aqueous extract was made basic by addition of potassium carbonate and was then extracted with diethyl ether. After being dried, the ether extract was fractionally distilled under reduced pressure. The fraction (I) distilling in the range of 106° C. at 0.2 mm. pressure to 136° C. at 0.5 mm. pressure weighed 127.1 g. and consisted of almost pure N-methyl-2-(p-methoxybenzyl)-3-methyl-4-ethyl-1,2,5,6-tetrahydropyridine. The fraction (II) distilling at 136–147° C. at 0.5 mm. pressure weighed 15.9 g.; a substantial proportion of this fraction was an addition yield of N-methyl-2-(p-methoxybenzyl)-3-methyl-4-ethyl-1,2,5,6-tetrahydropyridine.

A mixture of 127 g. of N-methyl-2-(p-methoxybenzyl-3-methyl-4-ethyl-1,2,5,6-tetrahydropyridine and 1450 ml. of concentrated (58 percent) hydrobromic acid was refluxed for approximately twenty-four hours. The reaction mixture was mixed with decolorizing charcoal and filtered. The filtrate was concentrated and then water was added, which caused separation of an oily layer. Concentrated ammonium hydroxide was added to the mixture, and the solid which formed was collected on a filter. The tan product thus collected weighed 47.8 g. and melted at 231–246° C. This solid was suspended in 100 ml. of ethanol, and the suspension was heated, then cooled, and filtered. The pale yellow solid thus collected weighed 37.4 g. and melted at 246–251° C. This product was 1,2,3,4,5,6-hexahydro-3-methyl - 6 - ethyl - 11-methyl-8-hydroxy-2,6,-methano-3-benzazocine.

A mixture of 40.8 g. of 1,2,3,4,5,6-hexahydro-3-methyl - 6 - ethyl - 11-methyl-8-hydroxy-2,6-methano-3-benzazocine and 120 ml. of acetic anhydride was heated on a steam bath for approximately three hours. The reaction mixture was then concentrated, ether was added, and the resulting mixture was added to ice in a separatory funnel. The ethereal layer was collected, washed with a solution of 80 g. of potassium hydroxide in 80 ml. of water, and concentrated under reduced pressure on a steam bath. The syrupy residue thus obtained, which was 1,2,3,4,5,6 - hexahydro - 3 - methyl - 6 - ethyl - 11 - methyl-8-acetoxy-2,6-methano-3-benzazocine, weighed 44.8 g. This product was dissolved in 125 ml. of chloroform and this solution was added to a solution of 18.6 g. of cyanogen bromide in 90 ml. of chloroform at room temperature. The resulting mixture was refluxed for two and one-half hours. The reaction mixture was then concentrated under reduced pressure to yield a residue which consisted chiefly of 1,2,3,4,5,6 - hexahydro - 3 - cyano-6-ethyl-11-methyl-8-acetoxy-2,6-methano-3-benzazocine. To this residue there were added 60 ml. of concentrated hydrochloric acid and 240 ml. of water, and the mixture was refluxed for about twenty-six hours. The reaction mixture was then concentrated under reduced pressure, diethyl ether and a small volume of water were added, and the mixture was filtered. Same oily material passed through the filter into the filtrate; this was recovered and retained. The solid crystalline product thus collected was dissolved in approximately 200 ml. of hot water, decolorizing charcoal was added and the solution was filtered while hot. Concentrated ammonium hydroxide was added to the solution, which was then cooled. The solid which separated from solution was collected on a filter and dried. A further crop of solid was obtained by working up the oily material mentioned above. The two crops were combined, ground finely, and heated in suspension in 100 ml. of methyl alcohol. The suspension was cooled and filtered. The solid thus collected weighed 16.7 g. and melted at 245–250° C. with decomposition. This product was 1,2,3,4,5,6 - hexahydro-6-ethyl-11-methyl-8-hydroxy-2,6-methano-3-benzazocine.

EXAMPLE 3

*1,2,3,4,5,6-hexahydro-3-(3-chloro-2-propenyl)-6-methyl-8-hydroxy-2,6-methano-3-benzazocine*

Following the procedure described in Example 1 hereinabove but substituting 8.15 g. of 1,2,3,4,5,6-hexahydro-6-methyl-8-hydroxy-2,6-methano - 3 - benzazocine for the 8.7 g. of the corresponding 6,11-dimethyl compound used in that example, there is obtained 1,2,3,4,5,6-hexahydro-3-(3 - chloro - 2 - propenyl) - 6-methyl - 8-hydroxy-2,6-methano-3-benzazocine (Formula I:

$$Y=-CH=CH-Cl;$$

lower alkylene=—CH$_2$—; R$^1$=—CH$_3$; R$^2$=—H; R$^3$=—H) in the form of a mixture of cis and trans isomers, having the molecular formula C$_{16}$H$_{20}$ClNO.

EXAMPLE 4

*1,2,3,4,5,6 - hexahydro - 3 - (3 - chloro - 2 - propenyl) - 8-hydroxy-2,6-methano-3-benzazocine*

Following the procedure described in the first part of Example 1 hereinabove but substituting 7.6 g. of 1,2,3,4,5,6 - hexahydro - 8 - hydroxy-2,6-methano-3-benzazocine for the 8.7 g. of the corresponding 6,11-dimethyl compound used in that example, here is obtained 1,2,3,4,5,6 - hexahydro-3-(3-chloro-2-propenyl)-8-hydroxy-2,6-methano-3-benzazocine (Formula I: Y=—CH=CH—Cl; lower alkylene=—CH$_2$—; R$^1$=—H; R$^2$=—H; R$^3$=—H) in the form of a mixture of cis and trans isomers, having the molecular formula C$_{15}$H$_{18}$ClNO.

EXAMPLE 5

*1,2,3,4,5,6-hexahydro-3-(3,3-dichloro-2-propenyl)-6,11-dimethyl-8-hydroxy-2,6-methano-3-benzazocine*

Following the procedure described in Example 1 hereinabove but using 1,3,3-trichloro-2-propene instead of 1,3-dichloro-1-propene as the alkylating agent, there was obtained 1,2,3,4,5,6-hexahydro-3-(3,3-dichloro - 2 - propenyl)-6,11-dimethyl-8-hydroxy-2,6-methano - 3 - benzazocine (Formula I: Y=—CH=C(Cl)$_2$; lower alkylene=—CH$_2$—; R$^1$=—CH$_3$; R$^2$=—CH$_3$; R$^3$=—H) having the molecular formula C$_{17}$H$_{21}$Cl$_2$NO, in the form of off-white crystals which melted at 145–147° C. The solubility of this compound in a mixture of 0.30 ml. of N/2 hydrochloric acid and 19.70 ml. of water was less than 0.25 percent, and in ethanol was less than 1 percent.

EXAMPLE 6

*1,2,3,4,5,6-hexahydro-3-(2-bromo-3-methyl-2-butenyl)-6,11-dimethyl-8-hydroxy-2,6-methano-3-benzazocine*

Following the procedure decribed in Example 1 hereinabove but substituting 9.05 g. of 1,2-dibromo-3-methyl-2-butene for the 4.4 g. of 1,3-dichloro-1-propene used in that example, there is obtained 1,2,3,4,5,6-hexahydro-3-(2 - bromo-3-methyl-2-butenyl)-6,11-dimethyl-8-hydroxy-2,6-methano-3-benzazocine (Formula I:

Y=—CBr=C(CH$_3$)$_2$; lower alkylene=—CH$_2$—;

R$^1$=—CH$_3$; R$^2$=—CH$_3$; R$^3$=—H), having the molecular formula C$_{19}$H$_{26}$BrNO.

EXAMPLE 7

*1,2,3,4,5,6-hexahydro-3-(3-cyanoallyl)-6,11-dimethyl-8-hydroxy-2,6-methano-3-benzazocine*

Following the procedure described in Example 1 hereinabove but substituting 5.7 g. of 3-cyanoallyl bromide for the 4.4 g. of the 1,3-dichloro-1-propene used in that example, there is obtained 1,2,3,4,5,6-hexahydro-3-(3-cyanoallyl)-6,11-dimethyl-8-hydroxy - 2,6 - methano - 3 - benzazocine (Formula I: Y=—CH=CH—CN; lower alkylene=—CH$_2$—; R$^1$=—CH$_3$; R$^2$=—CH$_3$; R$^3$=—H), having the molecular formula C$_{18}$H$_{22}$N$_2$O.

EXAMPLE 8

*1,2,3,4,5,6-hexahydro-3-(3,3-dicyanoallyl)-6,11-dimethyl-8-hydroxy-2,6-methano-3-benzazocine*

Following the procedure described in Example 1 hereinabove but substituting 5.5 g. of 1-chloro-3,3-dicyano-1-propene for the 4.4 g. of the 1,3-dichloro-1-propene used in that example, there is obtained 1,2,3,4,5,6-hexahydro-3 - (3,3 - dicyanoallyl) - 6,11 - dimethyl-8-hydroxy-2,6-methano-3-benzazocine (Formula I:

Y=—CH=C(CN)$_2$; lower alkylene=—CH$_2$—;

R$^1$=—CH$_3$; R$^2$=—CH$_3$; R$^3$=—H), having the molecular formula C$_{19}$H$_{21}$N$_3$O.

EXAMPLE 9

*1,2,3,4,5,6-hexahydro-3-cyclopropylmethyl-6,11-dimethyl-8-hydroxy-2,6-methano-3-benzazocine*

A mixture of 8.8 g. of 1,2,3,4,5,6-hexahydro-6,11-dimethyl-8-hydroxy-2,6-methano-3-benzazocine and 100 ml. of methanol was warmed, and when almost all of the solid had dissolved there were added 15 ml. of water and 10 g. of pulverized potassium carbonate. The resulting mixture was cooled to room temperature and stirred while adding dropwise, over a period of approximately fifteen minutes, 7.9 g. of cyclopropanecarbonyl chloride. The reaction mixture was stirred for four hours and then filtered. The filtrate was concentrated, the resulting residue was mixed with water, and the mixture was extracted with a mixture of two parts of benzene and one part of butanol. The benzene-butanol extract was washed with dilute hydrochloric acid and then dried and concentrated to a small volume. The solid was isolated from the resulting suspension by filtering, and the collected solid was washed with diethyl ether. This solid was dissolved in chloroform and the resulting solution was extracted with a solution of 2.5 g. of sodium hydroxide in water. The alkaline aqueous extract was acidified to Congo Red paper by addition of hydrochloric acid. Blowing air through the acidified solution caused crystallization of an off-white solid which was collected on a filter and dried. This product, which was 1,2,3,4,5,6-hexahydro-3-cyclopropanecarbonyl-6,11-dimethyl - 8-hydroxy-2,6-methano-3-benzazocine (Formula III: Y'=—cyclopropyl; 1-oxo-lower alkylene=—CO—; R$^1$=—CH$_3$; R$^2$=—CH$_3$; Z=—H), weighed 7.9 g. and melted at 179–180° C. A 1.9 g. sample of this compound was recrystallized from aqueous ethanol solution to yield 1.4 g. of off-white solid melting at 181–183° C.

A mixture of 6 g. of 1,2,3,4,5,6-hexahydro-3-cyclopropanecarbonyl - 6,11 - dimethyl - 8 - hydroxy - 2,6 - methano-3-benzazocine in 75 ml. of tetrahydrofuran and 2 g. of lithium aluminum hydride in tetrahydrofuran was stirred and refluxed for approximately three and one-half hours. To the reaction mixture there was added 6 ml. of water, and the mixture was filtered using a diatomaceous earth filter aid. The filtration proceeded very slowly. The filtrate was evaporated to dryness and the residue was stirred with hot water and filtered. There was thus obtained 2.0 g. of solid (crop 1) which melted at 188–195° C. with decomposition.

The solid which was collected on the filter with the diatomaceous earth filter aid was extracted with water, the aqueous extract being discarded, and the residue was extracted with tetrahydrofuran. The tetrahydrofuran extract was concentrated to yield 2.1 g. of white solid (crop 2) which melted at 190–200° C.

Crops 1 and 2 were separately treated as follows. Each crop was dissolved in dilute hydrochloric acid, the resulting solution was filtered, and the filtrate was made basic by addition of concentrated ammonium hydroxide, and the resulting precipitate was collected, and then was recrystallized from methanol. The two crops were then combined and recrystallized from methanol to yield 1.9 g. of shiny white crystals which melted at 201–204° C. The product thus obtained was 1,2,3,4,5,6-hexahydro-3-cyclopropylmethyl - 6,11-dimethyl-8-hydroxy-2,6-methano-3-benzazocine (Formula I: Y=—cyclopropyl; lower alkylene=—CH$_2$—; R$^1$=—CH$_3$; R$^2$=—CH$_3$; R$^3$=—H), having the molecular formula C$_{18}$H$_{25}$NO. This product was soluble in a mixture of 0.54 ml. of N/2 hydrochloric acid and 0.46 ml. of water to the extent of 5 percent, the pH of the 1 percent solution being 2.3; and when the pH of the 1 percent solution was gradually raised by addition of N/10 sodium hydroxide solution, a precipitate formed at pH 2.9.

EXAMPLE 10

*1,2,3,4,5,6-hexahydro-3-cyclopropylmethyl-6-methyl-8-hydroxy-2,6-methano-3-benzazocine*

Following the procedure described in Example 9 hereinabove but substituting 8.2 g. of 1,2,3,4,5,6-hexahydro-6-methyl - 8-hydroxy-2,6-methano-3-benzazocine for the 8.8 g. of the corresponding 6,11-dimethyl compound used in that example, there are obtained as the intermediate amide 1,2,3,4,5,6-hexahydro-3 - cyclopropanecarbonyl-6-methyl - 8 - hydroxy - 2,6 - methano - 3 - benzazocine (Formula III: Y'=—cyclopropyl; 1-oxo-lower alkylene =—CO—; $R^1$=—$CH_3$; $R^2$=—H; Z=—H) and as the final product 1,2,3,4,5,6-hexahydro-3-cyclopropylmethyl-6-methyl-8-hydroxy-2,6-methano-3-benzazocine (Formula I: Y=—cyclopropyl); lower alkylene=—$CR_2$—; $R^1$=—$CH_3$; $R^2$=—H; $R^3$=—H), having the molecular formula $C_{17}H_{23}NO$.

EXAMPLE 11

*1,2,3,4,5,6-hexahydro-3-cyclopropylmethyl-8-hydroxy-2,6-methano-3-benzazocine*

Following the procedure described in Example 9 hereinabove but substituting 7.7 g. of 1,2,3,4,5,6-hexahydro-8-hydroxy-2,6-methano-3-benzazocine for the 8.8 g. of the corresponding 6,11-dimethyl compound used in that example, there are obtained as the intermediate amide 1,2,3,4,5,6- - hexahydro - 3 - cyclopropanecarbonyl - 8 - hydroxy-2,6-methano-3-benzocine (Formula III: Y'=—cyclopropyl; 1-oxo-lower alkylene=—CO—; $R^1$=H; $R^2$= —H; Z=—H) and as the final product 1,2,3,4,5,6-hexahydro - 3 - cyclopropylmethyl - 8 - hydroxy - 2,6 - methano-3-benzazocine (Formula I: Y=—cyclopropyl; lower alkylene=—$CH_2$; $R_1$=—H; $R^2$=—H; $R^3$=—H), having the molecular formula $C_{16}H_{21}NO$.

EXAMPLE 12

*1,2,3,4,5,6,-hexahydro-3-cyclopropylmethyl-6-ethyl-11-methyl-8-hydroxy-2,6-methano-3-benzazocine*

Following a procedure similar to that described in Example 9 hereinabove, 9.4 g. of 1,2,3,4,5,6-hexahydro-6-ethyl - 11 - methyl - 8 - hydroxy - 2,6 - methano - 3 - benzazocine was dissolved in pyridine and interacted with 10.4 g. of cyclopropanecarbonyl chloride to yield 14.0 g. of 1,2,3,4,5,6-hexahydro-3-cyclopropanecarbonyl-6-ethyl - 11 - methyl - 8 - cyclopropanecarbonyloxy - 2,6-methano-3-benzazocine (Formula III: Y'=—cyclopropyl; 1-oxo-lower alkylene=—CO—; $R^1$=—$C_2H_5$; $R^2$=—$CH_3$; Z=cyclopropanecarbonyl) as a syrup, light orange in color. This ester-amide (14.0 g.) was reduced with lithium aluminum hydride (5.0 g.) in tetrahydrofuran to yield 6.4 g. of 1,2,3,4,5,6-hexahydro-3-cyclopropylmethyl-6-ethyl-11 - methyl - 8 - hydroxy - 2,6 - methano - 3 - benzazocine (Formula I: Y=—cyclopropyl; lower alkylene= —$CH_2$—; $R^1$=—$C_2H_5$; $R^2$=—$CH_3$; $R^3$=—H) having the molecular formula $C_{19}H_{27}NO$, in the form of a red syrup. When this syrup was mixed with diethyl ether and the mixture was allowed to stand, the product was obtained as off-white crystals which melted at 181–183° C. This product was soluble in a mixture of 0.34 ml. of N/2 hydrochloric acid and 0.66 ml. of water to the extent of 5 percent, the pH of the 1 percent solution being 2.2; and when the pH of the 1 percent solution was gradually raised by addition of N/10 sodium hydroxide solution, no precipitate formed at pH 7.0.

EXAMPLE 13

*1,2,3,4,5,6-hexahydro-3-cyanomethyl-6,11-dimethyl-8-hydroxy-2,6-methano-3-benzazocine*

Following a procedure similar to that described in Example 1 hereinabove but using 2.7 g. of chloroacetonitrile and 7.8 g. of 1,2,3,4,5,6-hexahydro-6,11-dimethyl-8-hydroxy-2,6-methano-3-benzazocine as the reactants, there were obtained 4.8 g. of 1,2,3,4,5,6-hexahydro-3-cyanomethyl - 6,11 - dimethyl - 8 - hydroxy-2,6-methano-3-benzazocine (Formula I: Y=—CN;

lower alkylene=—$CH_2$;

$R^1$=—$CH_3$; $R^2$=—$CH_3$; $R^3$=—H) having the molecular formula $C_{16}H_{20}N_2O$, in the form of white crystals which melted at 118–122° C. The solubility of this compound in water was less than 0.25 percent, and in ethanol was less than 1 percent (weight/volume).

EXAMPLE 14

*1,2,3,4,5,6-hexahydro-3-(2-chloro-2-propenyl)-6,11-dimethyl-8-hydroxy-2,6-methano-3-benzazocine*

Using a procedure similar to that described in Example 1 hereinabove, 3.3 g. of 1,2-dichloro-2-propene were interacted with 6.5 g. of 1,2,3,4,5,6-hexahydro-6,11-dimethyl-8-hydroxy-2,6-methano-3-benzazocine to produce 1,2,3,4, 5,6 - hexahydro - 3 - (2 - chloro - 2 - propenyl) - 6,11 - dimethyl-8-hydroxy-2,6-methano-3-benzazocine (Formula I: Y=—C(Cl)=$CH_2$; lower alkylene=—$CH_2$—;

$R^1$=—$CH_3$;

$R_2$=—$CM_3$—; $R_3$=—H) having the molecular formula $C_{17}H_{22}ClNO$, which was treated with hydrochloric acid to yield 4.5 g. of the corresponding hydrochloride in the form of white crystals which melted at 262–265° C. The solubility of the hydrochloride in water was less than 0.25 percent, and in ethanol was less than 1 percent (weight/volume).

EXAMPLE 15

*1,2,3,4,5,6-hexahydro-3-cyclobutylmethyl-6,11-dimethyl-8-hydroxy-2,6-methano-3-benzazocine*

Following a procedure similar to that described in Example 9 hereinabove, 8.9 g. of cyclobutylcarbonyl chloride and 8.8 g. of 1,2,3,4,5,6-hexahydro-6,11-dimethyl-8-hydroxy-2,6-methano-3-benzazocine were interacted to produce 6.7 g. of 1,2,3,4,5,6-hexahydro-3-cyclobutanecarbonyl - 6,11 - dimethyl - 8 - hydroxy - 2,6-methano-3-benzazocine (Formula III: Y'=—cyclobutyl; 1-oxo-lower alkylene = —CO—; $R^1$=—$CH_3$; $R_2$=—$CH_3$; Z=—H), M.P. 181–184° C. This amide (6.2 g.) was reduced with lithium aluminum hydride (3.0 g.) in tetrahydrofuran for two and one-half hours to yield 3.5 g. of 1,2,3,4,5,6-hexahydro-3-cyclobutylmethyl-6,11-dimethyl - 8 - hydroxy-2,6-methano-3-benzazocine (Formula I: Y=—cyclobutyl; lower alkylene=—$CH_2$—; $R^1$=—$CH_3$; $R_2$=—$CH_3$; $R^3$=—H), having the molecular formula $C_{19}H_{27}NO$, as white crystals which melted at 167–169° C. This compound was soluble in a mixture of 0.34 ml. of N/2 hydrochloric acid and 0.66 ml. of water to the extent of 5 percent. The pH of a 1% solution in this dilute aqueous acid was 1.0; and a precipitate formed when the pH was adjusted to 5.0 by addition of N/10 sodium hydroxide solution.

EXAMPLE 16

*1,2,3,4,5,6-hexahydro-3-cyclobutylmethyl-6-ethyl-11-methyl-8-hydroxy-2,6-methano-3 benzazocine*

Following a procedure similar to that described in Example 9 hereinabove, 1,2,3,4,5,6-hexahydro-6-ethyl-11-methyl-8-hydroxy-2,6-methano-3-benzazocine was acylated with cyclobutanecarbonyl chloride. The yellow syrup (6 g.) obtained as the acylation product, which was a mixture of 1,2,3,4,5,6-hexahydro-3-cyclobutanecarbonyl - 6 - ethyl - 11 - methyl - 8 - hydroxy - 2,6-methano-3-benzazocine (Formula III: Y'=cyclobutyl; 1-oxo-lower alkylene=—CO—; $R^1$=—$C_2H_5$; $R^2$=—$CH_3$; Z=—H) and 1,2,3,4,5,6-hexahydro-3-cyclobutanecarbonyl - 6 - ethyl - 11 - methyl - 8 - cyclobutanecarbonyloxy-2,6 - methano - 3 - benzazocine (Formula III: Y'=cyclobutyl; $R^1$=—$C_2H_5$; $R^2$=—$CH_3$; Z=cyclobutanecarbonyl), was reduced with lithium aluminum hydride (4 g.) in tetrahydrofuran to produce 3.1 g. of 1,2,3,4,5,6-hexahydro - 3 - cyclobutylmethyl - 6 - ethyl - 11 - methyl - 8-hydroxy-2,6-methano-3-benzazocine (Formula I:

Y=cyclobutyl;

lower alkylene=—CH$_2$—; R$^1$=—C$_2$H$_5$; R$^2$=—CH$_3$; R$^3$=—H), having the molecular formula C$_{20}$H$_{29}$NO, as white crystals which melted at 195–197° C. The solubility of this compound in water was less than 0.25 percent, and in ethanol was less than 1 percent (weight/volume).

EXAMPLE 17

*1,2,3,4,5,6-hexahydro-3-cyclopentylmethyl-6,11-dimethyl-8-hydroxy-2,6-methano-3-benzazocine*

Using a procedure similar to that described in Example 9 hereinabove, 8.8 g. of 1,2,3,4,5,6-hexahydro-6,11 - dimethyl - 8 - hydroxy - 2,6 - methano - 3 - benzazocine were acylated with 10.0 g. of cyclopentanecarbonyl chloride to produce 7.4 g. of 1,2,3,4,5,6-hexahydro-3-cyclopentanecarbonyl - 6,11 - dimethyl - 8 - hydroxy - 2,6-methano-3-benzazocine (Formula III: Y'=—cyclopentyl; 1-oxo-lower alkylene=—CO—; R$^1$=—CH$_3$; R$^2$=—CH$_3$; Z=—H) as white crystals which melted at 207–210° C. This amide (7 g.) was reduced with lithium aluminum hydride (4 g.) in tetrahydrofuran for about three hours to produce 3.8 g. of 1,2,3,4,5,6-hexahydro-3-cyclopentylmethyl - 6,11 - dimethyl - 8 - hydroxy - 2,6 - methano - 3-benzazocine (Formula I: Y=cyclopentyl;

lower alkylene=—CH$_2$;

R$^1$=—CH$_3$; R$^2$=—CH$_3$; R$^3$=—H), having the molecular formula C$_{20}$H$_{29}$NO. This compound was treated with hydrochloric acid to convert it to the hydrochloride, a white crystalline solid which melted at 230–233° C. This hydrochloride was soluble in water to the extent of 0.5 percent. The pH of the 0.5 percent aqueous solution was 6.1, and a precipitate formed when the pH was adjusted to 6.4 by addition of N/10 sodium hydroxide solution.

EXAMPLE 18

*1,2,3,4,5,6-hexahydro-3-cyclohexylmethyl-6,11-dimethyl-8-hydroxy-2,6-methano-3-benzazocine*

Following a procedure similar to that described in Example 9 hereinabove, 14.0 g. of cyclohexanecarbonyl chloride and 12.0 g. of 1,2,3,4,5,6-hexahydro-6,11-dimethyl-8-hydroxy-2,6-methano-3-benzazocine were interacted to produce 19.6 g. of 1,2,3,4,5,6-hexahydro-3-cyclohexanecarbonyl - 6,11 - dimethyl - 8 - hydroxy - 2,6-methano-3-benzazocine (Formula III: Y'=—cyclohexyl; 1-oxo-lower alkylene=—CO—; R$^1$=—CH$_3$; R$^2$=—CH$_3$; Z=—H) as a red-brown syrup. This product was reduced with lithium aluminum hydride (5.0 g.) in a tetrahydrofuran to yield 9.0 g. of 1,2,3,4,5,6-hexahydro-3-cyclohexylmethyl - 6,11 - dimethyl - 8 - hydroxy - 2,6-methano-3-benzazocine (Formula I: Y=—cyclohexyl;

lower alkylene=—CH$_2$; R$^1$=—CH$_3$; R$^2$=—CH$_3$;

R$^3$=—H)

having the molecular formula C$_{21}$H$_{31}$NO, as a pink glass. The solubility of this compound in a mixture of 0.32 ml. of N/2 hydrochloric acid and 19.68 ml. of water was less than 0.25 percent, and its solubility in ethanol was 5 percent (weight/volume) and addition of four volumes of water to the 5 percent solution in ethanol caused the compound to precipitate.

EXAMPLE 19

*1,2,3,4,5,6-hexahydro-3-(2-cyclopropylethyl)-6,11-dimethyl-8-hydroxy-2,6-methano-3-benzazocine*

Using a procedure similar to that described in Example 9 hereinabove, 4.2 g. of 1,2,3,4,5,6-hexahydro-6,11-dimethyl-8-hydroxy-2,6-methano-3-benzazocine was interacted with cyclopropaneacetyl chloride obtained by interaction of 4.4 g. of cyclopropaneacetic acid and 10 ml. of thionyl chloride. There was thus obtained 5.1 g. of 1,2,3,4,5,6 - hexahydro - 3-cyclopropaneacetyl-6,11-dimethyl-8-hydroxy - 2,6 - methano - 3 - benzazocine (Formula III: Y'=—cyclopropyl;

1-oxo-lower alkylene=—CO—CH$_2$—

R$^1$=—CH$_3$; R$^2$=—CH$_3$; Z=—H) as a brown syrup. This product was reduced with lithium aluminum hydride (2.0 g.) in tetrahydrofuran to produce 1.9 g. of 1,2,3,4,5,6 - hexahydro - 3-(2-cyclopropylethyl)-6,11-dimethyl-8-hydroxy-2,6-methano-3-benzazocine (Formula I:

Y=—cyclopropyl lower alkylene=—CH$_2$CH$_2$—; R$^1$=—CH$_3$; R$^2$=—CH$_3$; R$^3$=—H) having the molecular formula C$_{19}$H$_{27}$NO, M.P. 201–208° C. This compound was soluble in a mixture of 0.36 ml. of N/2 hydrochloric acid and 19.04 ml. of water to the extent of 0.25 percent; the pH of the 0.25 percent solution was 2.3, and this solution became slightly cloudy when it was gradually adjusted to pH 7.0 by addition of N/10 sodium hydroxide solution but no precipitate was deposited.

EXAMPLE 20

A. 5.0 g. of 1,2,3,4,5,6-hexahydro-3-cyclopropanecarbonyl - 6,11 - dimethyl - 8-hydroxy-2,6-methano-3-benzazocine was dissolved in 50 ml. of N sodium hydroxide solution, 10 ml. of dimethyl sulfate was added at room temperature, and the mixture was stirred vigorously for seven hours. The reaction mixture was then extracted with chloroform, and the chloroform layer was separated, washed with ammonium hydroxide solution, and dried. The chloroform solution was then concentrated on a steam bath to yield 6.9 g. of residue. This residue was further concentrated under reduced pressure (0.1 mm.). There was thus obtained 4.7 g. of 1,2,3,4,5,6-hexahydro-3 - cyclopropanecarbonyl - 6,11-dimethyl-8-methoxy-2,6-methano-3-benzazocine (Formula III: Y'=—cyclopropyl; 1-oxo-lower alkylene=—CO—; R$^1$=—CH$_3$; R$^2$=—CH$_3$; Z=—CH$_3$) as a yellow syrup. This product was dissolved in chloroform and the chloroform solution was washed with N sodium hydroxide solution and with dilute hydrochloric acid, and was then concentrated under reduced pressure. The residue thus obtained, which weighed 5.5 g., was reduced with lithium aluminum hydride (4.4 g.) in tetrahydrofuran for six hours. The reaction mixture was diluted with 8 ml. of water and filtered. The solid on the filter was washed with diethyl ether, and was then discarded. The filtrate and the wash liquid were combined and concentrated to yield 1,2,3,4,5,6-hexahydro-3 - cyclopropylmethyl - 6,11 - dimethyl - 8-methoxy-2,6-methano-3-benzazocine (Formula I: Y=—cyclopropyl; lower alkylene=—CH$_2$—; R$^1$=—CH$_3$, R$^2$=—CH$_3$; R$^3$=—CH$_3$), having the molecular formula C$_{19}$H$_{27}$NO, as a yellow syrup. This product was dissolved in ether, and hydrogen chloride was added to convert the base to the hydrochloride salt. The hydrochloride was collected on a filter and dried. There was thus obtained 3.7 g. of the hydrochloride in the form of white crystals which melted at 219–220° C. This salt was soluble in water to the extent of 20 percent. The pH of a 1 percent aqueous solution of the salt was 6.1 and, when the pH of this solution was adjusted to 7.0 by addition of N/10 sodium hydroxide solution, a precipitate formed.

B. When 1,2,3,4,5,6-hexahydro-3-cyclopropylmethyl-6,11-dimethyl-8-hydroxy-2,6-methano-3-benzazocine is used instead of 1,2,3,4,5,6-hexahydro-3-cyclopropanecarbonyl-6,11 - dimethyl - 8-hydroxy-2,6-methano-3-benzazocine in the alkylation procedure of part A above, there is obtained in one step the same 1,2,3,4,5,6-hexahydro-3-cyclopropyl - 6,11 - dimethyl - 8-methoxy-2,6-methano-3-benzazocine obtained by the two-step alkylation-reduction procedure described in part A.

C. When 1,2,3,4,5,6 - hexahydro - 3 - (3 - chloroacrylamido) - 6,11 - dimethyl-8-hydroxy-2,6-methano-3-benzazocine (Formula III: Y'=—CH=CH—Cl; 1-oxo-lower alkylene=—CO—; R¹=—CH₃; R²=—CH₃; Z=—H) (obtained by acylation of 1,2,3,4,5,6-hexahydro-6,11-dimethyl - 8 - hydroxy - 2,6 - methano-3-benzazocine with 3-chloroacrylic anhydride) is used as the starting material instead of 1,2,3,4,5,6-hexahydro-3-cyclopropanecarbonyl-6,11-dimethyl-8-hydroxy-2,6-methano-3-benzazocine in the procedure of part A above, there is obtained, as the methylation product, 1,2,3,4,5,6-hexahydro-3-(3-chloroacrylamido) - 6,11 - dimethyl - 8-methoxy-2,6-methano-3-benzazocine (Formula III: Y'=—CH=CH—Cl; 1-oxo-lower alkylene=—CO—; R¹=—CH₃; R²=—CH₃;

Z=—CH₃)

and when this methylation product is reduced with lithium aluminum hydride there is produced 1,2,3,4,5,6-hexahydro - 3 - (3 - chloro - 2 - propenyl) - 6,11-dimethyl-8-methoxy-2,6-methano-3-benzazocine (Formula I:

Y=—CH=CH—Cl lower alkylene=—CH₂—; R¹=—CH₃; R²=—CH₃; R³=—CH₃). This same product is obtained when 1,2,3,4,5,6 - hexahydro-3-(3-chloro-2-propenyl)-6,11-dimethyl-8-hydroxy-2,6-methano-3-benzazocine is interacted with diazomethane.

EXAMPLE 21

A. A mixture of 4.2 g. of 1,2,3,4,5,6-hexahydro-3-cyclohexylmethyl - 6,11-dimethyl-8-hydroxy-2,6-methano-3-benzazocine and 25 ml. of acetic anhydride was allowed to stand overnight at room temperature. The reaction mixture was concentrated under reduced pressure, the residue was taken up in diethyl ether, and hydrogen chloride was added. The crystalline solid which separated from solution was recrystallized from petroleum ether twice, the second time with charcoaling, and then was washed with ethyl acetate to yield 3.2 g. of 1,2,3,4,5,6-hexahydro-3 - cyclohexylmethyl - 6,11 - dimethyl - 8 - acetoxy - 2,6-methano-3-benzazocine (Formula I: Y=—cyclohexyl; lower alkylene=—CH₂—; R¹=—CH₃; R²=—CH₃; R³=CH₃CO—.

B. Interaction of 1,2,3,4,5,6-hexahydro-3-cyclopropylmethyl - 6,11 - dimethyl - 8 - hydroxy - 2,6-methano-3-benzazocine with nicotinoyl chloride yields 1,2,3,4,5,6-hexahydro - 3 - cyclopropylmethyl - 6,11-dimethyl-8-nicotinoyloxy-2,6-methano-3-benzazocine

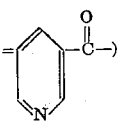

(Formula I: Y=—cyclopropyl; lower alkylene=—CH₂—; R¹=—CH₃; R²=—CH₃; R³=)

EXAMPLE 22

*1,2,3,4,5,6-hexahydro-3-(2-methyl-2-propenyl)-6,11-dimethyl-8-hydroxy-2,6-methano-3-benzazocine*

Using a procedure similar to that described in Example 1 hereinabove, 3.3 g. of 1-chloro-2-methyl-2-propene were interacted with 7.5 g. of 1,2,3,4,5,6-hexahydro-6,11-dimethyl-8-hydroxy-2,6-methano-3-benzazocine having the molecular formula C₁₈H₂₅NO, which was treated with hydrochloric acid to yield 3.6 g. of the corresponding hydrochloride in the form of off-white crystals which melted at 260–261° C. (dec.). The solubility of the hydrochloride in water was less than 0.25 percent, and in ethanol was less than 1 percent (weight/volume). Treatment of the base with diazomethane yields 1,2,3,4,5,6-hexahydro - 6,11 - dimethyl - 8-methoxy-2,6-methano-3-benzazocine and with acetic anhydride yields 1,2,3,4,5,6-hexahydro - 6,11-dimethyl-8-acetoxy-2,6-methano-3-benzazocine.

EXAMPLE 23

Following the procedure of Example 9 hereinabove but using the dextro form in one instance, and the levo form in another instance, of 1,2,3,4,5,6-hexahydro-6,11-dimethyl-8-hydroxy-2,6-methano-3-benzazocine instead of the racemic form, the respective final products of the acylation and reduction steps were the dextro- and the levo-forms of 1,2,3,4,5,6-hexahydro-3-cyclopropylmethyl-6,11-dimethyl-8-hydroxy-2,6-methano-3-benzazocine. The dextro compound was in the form of white crystals which melted at 194–196° C. The levo compound was initially obtained as an oil which later crystallized to yield white crystals which melted at 194–196° C.

Compounds of this invention which were prepared as described in the foregoing examples were found to be antagonists of certain strong analgesics. Thus, when tested in rats by a modified D'Amour-Smith test procedure and in dogs, they were found to be antagonists of the analgesic activity of morphine and meperidine. In this test procedure, when the compounds of this invention were administered prior to or simultaneously with administration of morphine or meperidine, the expected analgesic effect of the latter was decreased with increasing dosage levels of the former to a point where no analgesic effect was obtained. And when the new compounds were administered after the administration of morphine or meperidine, the analgesic effect was diminished or terminated, depending on the dosage levels involved. For example representative compounds of this invention, each in the form of an aqueous solution of the lactic acid acid-addition salt, were administered subcutaneously to rats to determine the dosage level, in terms of weight of antagonist per kilogram of body weight of the animal, which caused reduction of the analgesic effect of a 60 mg./kg. dose of meperidine hydrochloride by approximately 50 percent or 15 mg./kg. dose of morphine sulfate, so that the analgesic effect produced by the combination of the antagonist and the meperidine hydrochloride or the morphine sulfate was substantially the same as the analgesic effect produced by a 30 mg./kg. dose of meperidine hydrochloride alone or 7.5 mg./kg. of morphine sulfate alone, respectively. The results thus obtained for the lactic acid acid-addition salt of each of the indicated compounds were as follows:

| Compound of Example No. | Mg./kg. versus meperidine | Mg./kg. versus morphine |
| --- | --- | --- |
| 1 (trans form) | 0.039 | 0.21 |
| 1 (cis form) | 0.018 | 0.048 |
| 2 | (¹) | (¹) |
| 5 | 5.1 | |
| 9 (amide intermediate) | 26 | 0.029 |
| 9 (final product, racemic form) | 0.019 | 0.046 |
| 12 | 0.024 | |
| 13 | 17.0 | |
| 14 | 4.2 | 5.8 |
| 15 | 0.37 | 0.60 |
| 16 | 0.45 | 0.63 |
| 17 | 0.28 | 0.5 |
| 18 | 14.5 | 18 |
| 21 | 13.5 | |
| 23 (dextro form) | 0.07 | |
| 23 (levo form) | 0.01 | |
| 22 | .094 | 0.19 |

¹ Low activity.

In addition to having antagonistic activity toward morphine and meperidine, 1,2,3,4,5,6-hexahydro-3-cyclopropylmethyl - 6,11 - dimethyl - 8 - hydroxy - 2,6 - methano-3- benzazocine and the corresponding 8-methoxy compound were found to have muscle relaxant properties, for instance when tested in mice by the inclined screen method and in cats by polysynaptic blocking activity. These two compounds were also found to have anticonvulsant properties when tested in mice against pentylenetetrazol and maximal electric shock.

Moreover, 1,2,3,4,5,6-hexahydro-3-cyclopropylmethyl-6,7 - dimethyl-8-hydroxy-2,6-methano-3-benzazocine was found to have outstanding value as a strong analgesic agent when administered to humans, for instance in an oral dose in the range of 0.25 mg. to 2 mg. and in an intermuscular dose in the range of 0.125 mg. to 2 mg., and this compound did not support morphine addition in stabilized morphine addicts.

I claim:

1. A 1,2,3,4,5,6-hexahydro - 3 - (Y-lower alkylene—)-6-($R^1$)-11-($R^2$)-8-($R^3$—O—) - 2,6 - methano - 3 - benzazocine having the structural formula

[structural formula with $R^3$—O—, CH—$R^2$, $R^1$, N-lower alkylene-Y]

in which Y is a member of the group consisting of: halo-lower alkenyl having 1–2 members of the group consisting of chlorine and bromine attached to ethylenic carbon; cyano; cyano-lower alkenyl; and cycloalkyl having 3–7 ring carbons; $R^1$ is a member of the group consisting of hydrogen and lower alkyl; $R^2$ is a member of the group consisting of hydrogen, methyl, and ethyl; and $R^3$ is a member of the group consisting of hydrogen, methyl, and, when Y is other than cycloalkyl, the further members lower alkanoyl, and pyridinecarbonyl.

2. A 1,2,3,4,5,6 - hexahydro - 3 - cycloalkylmethyl-6-lower alkyl-11-methyl - 8 - hydroxy - 2,6 - methano-3-benzazocine having the structural formula

[structural formula with H—O—, CH—$CH_3$, $R^1$, N—$CH_2$—Y]

in which Y is cycloalkyl having 3–7 ring carbons and $R^1$ is lower alkyl.

3. A 1,2,3,4,5,6-hexahydro-3-(Y—$CH_2$—) - 6 - lower alkyl-11-methyl-8-hydroxy - 2,6 - methano-3-benzazocine having the structural formula

[structural formula with H—O—, CH—$CH_3$, $R^1$, N—$CH_2$—Y]

in which Y is halo-lower alkenyl having 1–2 chlorine atoms attached to ethylenic carbon and $R^1$ is lower alkyl.

4. A 1,2,3,4,5,6-hexahydro - 3 - cyanomethyl-6-lower alkyl-11-methyl - 8 - hydroxy-2,6-methano-3-benzazocine having the structural formula

[structural formula with H—O—, CH—$CH_3$, $R^1$, N—$CH_2$—CN]

in which $R^1$ is lower alkyl.

5. A 1,2,3,4,5,6-hexahydro-3-(Y—$CH_2$—) - 6 - lower alkyl-11-methyl - 8 - hydroxy-2,6-methano-3-benzazocine having the structural formula

[structural formula with H—O—, CH—$CH_3$, $R^1$, N—$CH_2$—Y]

in which Y is cyano-lower alkenyl and $R^1$ is lower alkyl.

6. A 1,2,3,4,5,6-hexahydro - 3 - cycloalkylmethyl-6,11-dimethyl - 8 - hydroxy-2,6-methano-3-benzazocine having the structural formula

[structural formula with H—O—, CH—$CH_3$, $CH_3$, N—$CH_2$—Y]

in which Y is cycloalkyl having 3–7 ring carbons.

7. A 1,2,3,4,5,6-hexahydro - 3 - cyclopropylmethyl-6-lower alkyl-11-methyl - 8 - hydroxy-2,6-methano-3-benzazocine having the structural formula

[structural formula with H—O—, CH—$CH_3$, $R^1$, N—$CH_2$—Y]

in which Y is cyclopropyl and $R^1$ is lower alkyl.

8. 1,2,3,4,5,6-hexahydro - 3 - cyclopropylmethyl-6,11-dimethyl-8-hydroxy-2,6-methano-3-benzazocine.

9. 1,2,3,4,5,6 - hexahydro - 3 - cyclopropylmethyl-6-ethyl-11-methyl-8-hydroxy-2,6-methano-3-benzazocine.

10. 1,2,3,4,5,6-hexahydro - 3 - (3-chloro-2-propenyl)-6,11-dimethyl-8-hydroxy-2,6-methano-3-benzazocine.

11. A 1,2,3,4,5,6-hexahydro - 3 - cycloalkylmethyl-6-lower alkyl-11-methyl - 8 - lower alkoxy-2,6-methano-3-benzazocine having the structural formula

[structural formula with $R^3$—O—, CH—$CH_3$, $R^1$, N—$CH_2$—Y]

in which Y is cycloalkyl having 3–7 ring carbons, $R^1$ is lower alkyl; and $R^3$ is methyl.

12. 1,2,3,4,5,6-hexahydro - 3 - cyclopropylmethyl-6,11-dimethyl-8-methoxy-2,6-methano-3-benzazocine.

13. A 1,2,3,4,5,6-hexahydro - 3 - [Y′—(1-oxo-lower alkylene)]-6-lower alkyl - 11 - methyl-8-(Z—O—)-2,6-methano-3-benzazocine having the structural formula

[structural formula with Z—O—, CH—$R^2$, $R^1$, N-(1-oxo-lower alkylene)-Y′]

in which Z is a member of the group consisting of hydrogen, methyl, and Y′—(1-oxo-lower alkylene)—, Y′ is a member of the group consisting of: halo-lower alkenyl having 1–2 members of the group consisting of chlorine and bromine attached to ethylenic carbon; cyanomethyl; cyano-lower alkenyl; and cycloalkyl having 3–7 ring carbons; $R^1$ is a member of the group consisting of hydrogen and lower alkyl; and $R^2$ is a member of the group consisting of hydrogen, methyl, and ethyl.

14. A 1,2,3,4,5,6-hexahydro - 3 - (cycloalkyl —C—)-

6-lower alkyl-11-methyl - 8 - hydroxy - 2,6 - methano-3-benzazocine having the structural formula

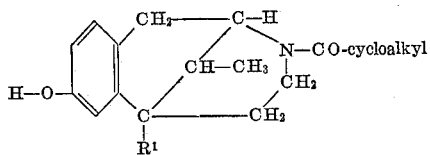

in which $R^1$ is lower alkyl and cycloalkyl has 3–7 ring carbons.

15. A 1,2,3,4,5,6 - hexahydro - 3 - (cyclopropyl—CO—)-6-lower alkyl - 11 - methyl - 8 - hydroxy-2,6-methano-3-benzazocine having the structural formula

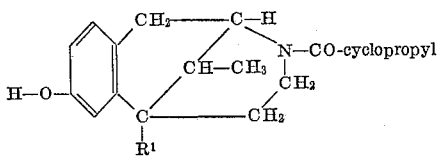

in which $R^1$ is lower alkyl.

16. 1,2,3,4,5,6-hexahydro - 3 - cyclopropanecarbonyl-6,11-dimethyl-8-hydroxy-2,6-methano-3-benzazocine.

17. A compound of the formula

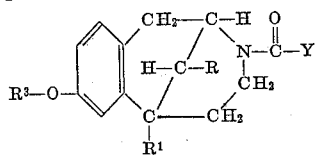

wherein Y is cyclopropyl, R is a member of the group consisting of hydrogen, methyl, and ethyl, $R^1$ is a member of the group consisting of hydrogen and alkyl of 1 to 3 carbon atoms, and $R^3$ is a member of the group consisting of hydrogen and methyl.

18. A member of the group consisting of a base of the formula:

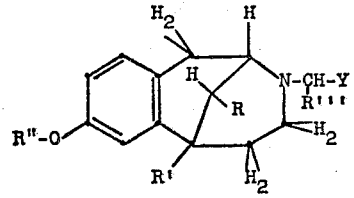

wherein Y is cyclopropyl; R is a member of the group consisting of hydrogen, methyl and ethyl; R' is a member of the group consisting of hydrogen and alkyl of 1 to 3 carbon atoms; R'' is a member of the group consisting of hydrogen and methyl; and R''' is a member selected from the group consisting of hydrogen and methyl; and nontoxic addition salts of said base with pharmaceutically acceptable acids.

References Cited

UNITED STATES PATENTS

| | | | |
|---|---|---|---|
| 2,924,603 | 2/1960 | Gordon et al. | 260—293.4 |
| 2,959,594 | 11/1960 | Gordon et al. | 260—294.3 |

NORMA S. MILESTONE, *Acting Primary Examiner.*

D. M. McCUTCHEN, I. MARCUS, *Examiners.*

D. M. KERR, A. D. SPEVACK, *Assistant Examiners.*

UNITED STATES PATENT OFFICE
CERTIFICATE OF CORRECTION

Patent No. 3,372,165　　　　　　　　　　　　　　　　March 5, 1968

Sydney Archer

It is certified that error appears in the above identified patent and that said Letters Patent are hereby corrected as shown below:

Column 8, line 5, "(p-methoxybenzyl" should read -- (p-methoxybenzyl) --; line 6, "(58 percent)" should read -- (48 percent) --; line 46, "Same oily" should read -- Some oily --. Column 11, line 29, "-3-benzocine" should read -- -3-benzazocine --. Column 12, line 23, "$R^2=-CM_3$" should read -- $R^2=-CH_3$ --. Column 17, line 13, "intermuscular" should read -- intramuscular --; lines 54 to 60, the formula should appear as shown below:

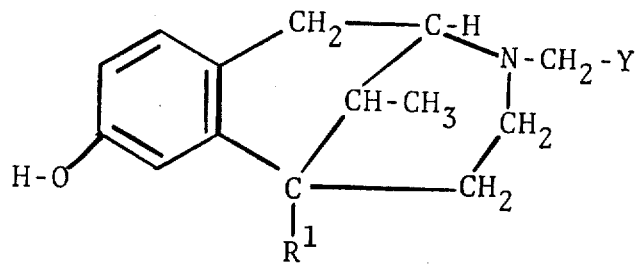

Column 18, line 75, "(cycloalkyl-C-)" should read -- (cycloalkyl-CO-) --.

Signed and sealed this 13th day of January 1970.

(SEAL)
Attest:

EDWARD M. FLETCHER, JR.
Attesting Officer

WILLIAM E. SCHUYLER, JR.
Commissioner of Patents